(12) United States Patent
Prasad Challa (10) Patent No.: US 12,337,894 B2
(45) Date of Patent: Jun. 24, 2025

(54) VEHICULAR CONTROL SYSTEM WITH TRAFFIC JAM ASSIST

(71) Applicant: Magna Electronics Inc., Auburn Hills, MI (US)

(72) Inventor: Venkata Satya Siva Prasad Challa, Troy, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 147 days.

(21) Appl. No.: 17/445,198

(22) Filed: Aug. 17, 2021

(65) Prior Publication Data

US 2022/0048509 A1 Feb. 17, 2022

Related U.S. Application Data

(60) Provisional application No. 62/706,438, filed on Aug. 17, 2020.

(51) Int. Cl.
*B62D 15/02* (2006.01)
*B60W 30/09* (2012.01)
(Continued)

(52) U.S. Cl.
CPC ........... *B62D 15/025* (2013.01); *B60W 30/09* (2013.01); *B60W 30/0953* (2013.01);
(Continued)

(58) Field of Classification Search
CPC .... B60W 30/143; B60W 30/09; B60W 30/10; B60W 30/12; B60W 30/16;
(Continued)

(56) References Cited

U.S. PATENT DOCUMENTS

| 5,550,677 A | 8/1996 | Schofield et al. |
| 5,670,935 A | 9/1997 | Schofield et al. |

(Continued)

OTHER PUBLICATIONS

Snider J.M., "Automatic Steering Methods for Autonomous Automobile Path Tracking", Feb. 2009, CMU thesis.
(Continued)

*Primary Examiner* — Russell Frejd
*Assistant Examiner* — Brandon Z Willis
(74) *Attorney, Agent, or Firm* — HONIGMAN LLP (57) ABSTRACT

A vehicular control system includes a camera and an electronic control unit (ECU) that processes image data captured by the camera. The ECU, via processing of the image data, determines lane information of a traffic lane. The lane information includes lane boundaries. The ECU also determines presence of other vehicles on the road ahead of the equipped vehicle. The ECU, responsive to determining presence of a target vehicle ahead of the equipped vehicle, and at least in part via processing by the image data, predicts a change in velocity of the target vehicle relative to the equipped vehicle. The ECU, responsive to determining the lane information and responsive to predicting the change in velocity of the target vehicle, generates longitudinal and lateral commands for centering the vehicle within the traffic lane and maintaining a threshold distance between the equipped vehicle and the target vehicle.

15 Claims, 3 Drawing Sheets

(51) Int. Cl.
  *B60W 30/095* (2012.01)
  *B60W 30/10* (2006.01)
  *B60W 30/18* (2012.01)
  *B60W 40/04* (2006.01)
  *B60W 50/029* (2012.01)
  *B60W 50/14* (2020.01)
  *G06F 18/25* (2023.01)
  *G06T 7/70* (2017.01)
  *G06V 20/58* (2022.01)

(52) U.S. Cl.
  CPC ...... *B60W 30/10* (2013.01); *B60W 30/18018* (2013.01); *B60W 30/18159* (2020.02); *B60W 40/04* (2013.01); *B60W 50/029* (2013.01); *B60W 50/14* (2013.01); *G06F 18/25* (2023.01); *G06T 7/70* (2017.01); *G06V 20/584* (2022.01); *B60W 2050/0292* (2013.01); *B60W 2050/146* (2013.01); *B60W 2420/403* (2013.01); *B60W 2420/408* (2024.01); *B60W 2552/53* (2020.02); *B60W 2554/402* (2020.02); *B60W 2554/404* (2020.02); *B60W 2554/4041* (2020.02); *B60W 2554/80* (2020.02); *G06T 2207/30236* (2013.01); *G06T 2207/30256* (2013.01)

(58) Field of Classification Search
  CPC ..... B60W 30/18159; B60W 30/18018; B60W 40/04; B60W 50/029; B60W 2050/0292; B60W 2420/52; B60W 2420/42; B60W 2420/403; B60W 2552/53; B60W 2552/15; B60W 2554/402; B60W 2554/4041; B60W 2554/4042; B60W 2554/404; B60W 2554/4045; B60W 2554/80; B60W 2554/804; B60W 2554/802; B60W 2720/10; B60W 2720/12; B60W 2754/10; B60W 2754/30; B60W 2754/50; G06T 7/70; G06T 2207/30236; G06T 2207/30256; G06T 2207/30252; G08G 1/166; G08G 1/167; G06V 20/588; G06V 20/58; B62D 15/025; B62D 15/026
  See application file for complete search history.

(56) References Cited

U.S. PATENT DOCUMENTS

| | | |
|---|---|---|
| 5,949,331 A | 9/1999 | Schofield et al. |
| 6,690,268 B2 | 2/2004 | Schofield et al. |
| 6,824,281 B2 | 11/2004 | Schofield et al. |
| 7,038,577 B2 | 5/2006 | Pawlicki et al. |
| 7,480,149 B2 | 1/2009 | DeWard et al. |
| 7,720,580 B2 | 5/2010 | Higgins-Luthman |
| 7,855,755 B2 | 12/2010 | Weller et al. |
| 8,256,821 B2 | 9/2012 | Lawlor et al. |
| 9,180,908 B2 | 11/2015 | Van Dan Elzen et al. |
| 9,487,159 B2 | 11/2016 | Achenbach |
| 9,596,387 B2 | 3/2017 | Achenbach et al. |
| 9,871,971 B2 | 1/2018 | Wang et al. |
| 9,896,039 B2 | 2/2018 | Achenbach et al. |
| 9,988,047 B2 | 6/2018 | Johnson et al. |
| 10,032,369 B2 | 7/2018 | Koravadi |
| 10,055,651 B2 | 8/2018 | Chundrlik, Jr. et al. |
| 10,071,687 B2 | 9/2018 | Ihlenburg et al. |
| 10,099,614 B2 | 10/2018 | Diessner |
| 10,268,904 B2 | 4/2019 | Gupta |
| 10,315,651 B2 | 6/2019 | Fiaschetti et al. |
| 10,449,899 B2 | 10/2019 | Gupta et al. |
| 10,829,121 B1* | 11/2020 | Allan .............. B60W 30/18163 |
| 11,433,862 B2* | 9/2022 | Eigel .......................... B60T 7/22 |
| 2005/0143895 A1* | 6/2005 | Kato .................... B60W 30/16 180/170 |
| 2009/0295181 A1 | 12/2009 | Lawlor et al. |
| 2014/0160284 A1 | 6/2014 | Achenbach et al. |
| 2014/0226012 A1 | 8/2014 | Achenbach |
| 2015/0015713 A1 | 1/2015 | Wang et al. |
| 2015/0197225 A1* | 7/2015 | Raste .............. B60W 30/18136 701/72 |
| 2015/0327398 A1 | 11/2015 | Achenbach et al. |
| 2017/0001642 A1* | 1/2017 | Kumai .................. B60W 30/16 |
| 2017/0080939 A1* | 3/2017 | Raghu ................... B60W 30/16 |
| 2017/0232966 A1* | 8/2017 | Ishioka ................. B60W 10/04 701/96 |
| 2019/0279507 A1* | 9/2019 | Ishisaka ................... G08G 1/16 |
| 2020/0269839 A1* | 8/2020 | Sato .................. B60W 50/0097 |
| 2020/0283025 A1* | 9/2020 | Honda ............. B60W 60/0025 |
| 2022/0048504 A1 | 2/2022 | Prasad Challa et al. |
| 2022/0048566 A1 | 2/2022 | Prasad Challa et al. |

OTHER PUBLICATIONS

Werling et al., Invariant Trajectory Tracking With a Full-Size Autonomous Road Vehicle, IEEE, vol. 26, No. 4, Aug. 2010.
Werling et al., Optimal trajectories for time-critical street scenarios using discretized terminal manifolds, The International Journal of Robotics Research, Mar. 2012.

* cited by examiner

VEHICULAR CONTROL SYSTEM WITH TRAFFIC JAM ASSIST

CROSS REFERENCE TO RELATED APPLICATION

The present application claims the filing benefits of U.S. provisional application Ser. No. 62/706,438, filed Aug. 17, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driving assistance system or vision system or imaging system for a vehicle that includes a camera disposed at a vehicle equipped with the vehicular control system and viewing at least forward of the vehicle. The camera captures image data. The system also includes an electronic control unit (ECU) with electronic circuitry and associated software. The electronic circuitry of the ECU includes an image processor for processing image data captured by the camera. The ECU, via processing by the image processor of image data captured by the camera, determines lane information of a traffic lane along a road being traveled by the equipped vehicle. The lane information includes lane boundaries. The ECU, via processing by the image processor of image data captured by the camera, determines presence of other vehicles on the road ahead of the equipped vehicle. The ECU, responsive to determining presence of a target vehicle ahead of the equipped vehicle and travelling in the same traffic lane as the equipped vehicle, and at least in part via processing by the image processor of image data captured by the camera, predicts a change in velocity of the target vehicle relative to the equipped vehicle arising from acceleration by the target vehicle or deceleration by the target vehicle. The ECU, responsive to determining the lane information and responsive to predicting the change in velocity of the target vehicle, generates longitudinal and lateral commands for centering the vehicle within the traffic lane and maintaining a threshold distance between the equipped vehicle and the target vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects (e.g., vehicles and/or traffic lanes) at or near the vehicle and in the predicted path of the vehicle, such as to assist a driver of the vehicle in maneuvering the vehicle in a rearward direction. The vision system optionally includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
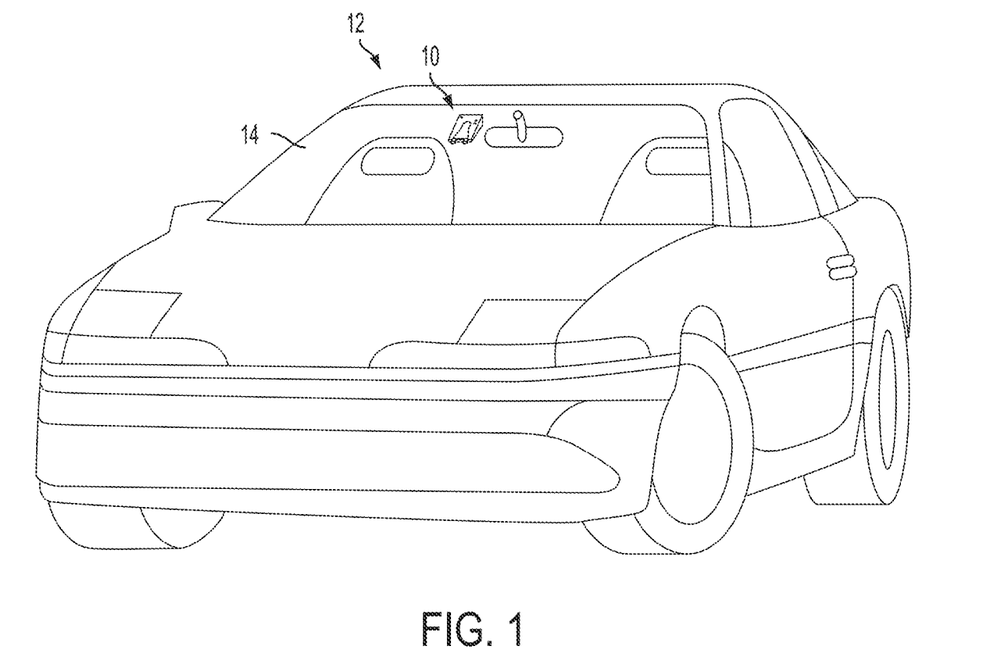
FIG. 1 is a perspective view of a vehicle with a vision system that incorporates a camera.

Referring now to the drawings and the illustrative embodiments depicted therein, a vision system 10 for a vehicle 12 includes at least one exterior viewing imaging sensor or camera, such as a forward viewing imaging sensor or camera, which may be disposed at and behind the windshield 14 of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. The forward viewing camera disposed at the windshield of the vehicle views through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) having electronic circuitry and associated software, with the electronic circuitry including a data processor or image processor that is operable to process image data captured by the camera or cameras, whereby the ECU may detect or determine presence of objects or the like and/or the system provide displayed images at a display device for viewing by the driver of the vehicle. The data transfer or signal communication from the camera to the ECU may comprise any suitable data or communication link, such as a vehicle network bus or the like of the equipped vehicle. The system may utilize aspects of U.S. patent applications Ser. No. 17/445,199, filed Aug. 17, 2021 for VEHICULAR CONTROL SYSTEM WITH ENHANCED LANE CENTERING, now U.S. Pat. No. 12,043,309, and/or Ser. No. 17/445,200, filed Aug. 17, 2021 for VEHICULAR CONTROL SYSTEM WITH AUTONOMOUS BRAKING, now U.S. Pat. No. 11,964,691 which are hereby incorporated herein by reference in their entireties.

The forward viewing or front-looking camera (FLC) is an integral part of Advanced Driver Assistance Systems (ADAS) deployed in passenger vehicles today. The FLC provides a lot of information about the environment in front of vehicle. Object and lane information from the FLC is commonly used for longitudinal and lateral control of vehicles in systems such as adaptive cruise control, lane-keeping assist, lane centering, etc. Implementations herein include a system that enables simultaneous longitudinal and lateral control of a vehicle equipped with the forward viewing camera for a traffic jam assist (TJA) feature. The TJA feature assists the driver of a vehicle during high traffic conditions, such as when there is high traffic density and/or high traffic speed. For example, the system allows the equipped vehicle to follow a driver-determined set speed profile in the absence of target vehicle (i.e., the absence of a vehicle within a threshold distance ahead of the equipped vehicle and travelling in the same lane as the equipped vehicle).

The system may control the equipped vehicle to maintain a driver-selected or driver-determined comfort time-gap from the target vehicle if present. That is, the system may allow the user to configure a travel time gap between the equipped vehicle and a leading vehicle (e.g., 1 second, 2 seconds, 3 seconds, etc.) where the travel time gap represents an amount of time it would take the equipped vehicle to reach an object in front of the equipped vehicle when travelling at the current speed. The system may additionally or alternatively maintain lane centering of the vehicle within the traffic lane in which the vehicle is traveling (i.e., control lateral movement of the vehicle to maintain a centerline of the vehicle at the approximate centerline of the lane the vehicle is travelling along).

Figure 2:
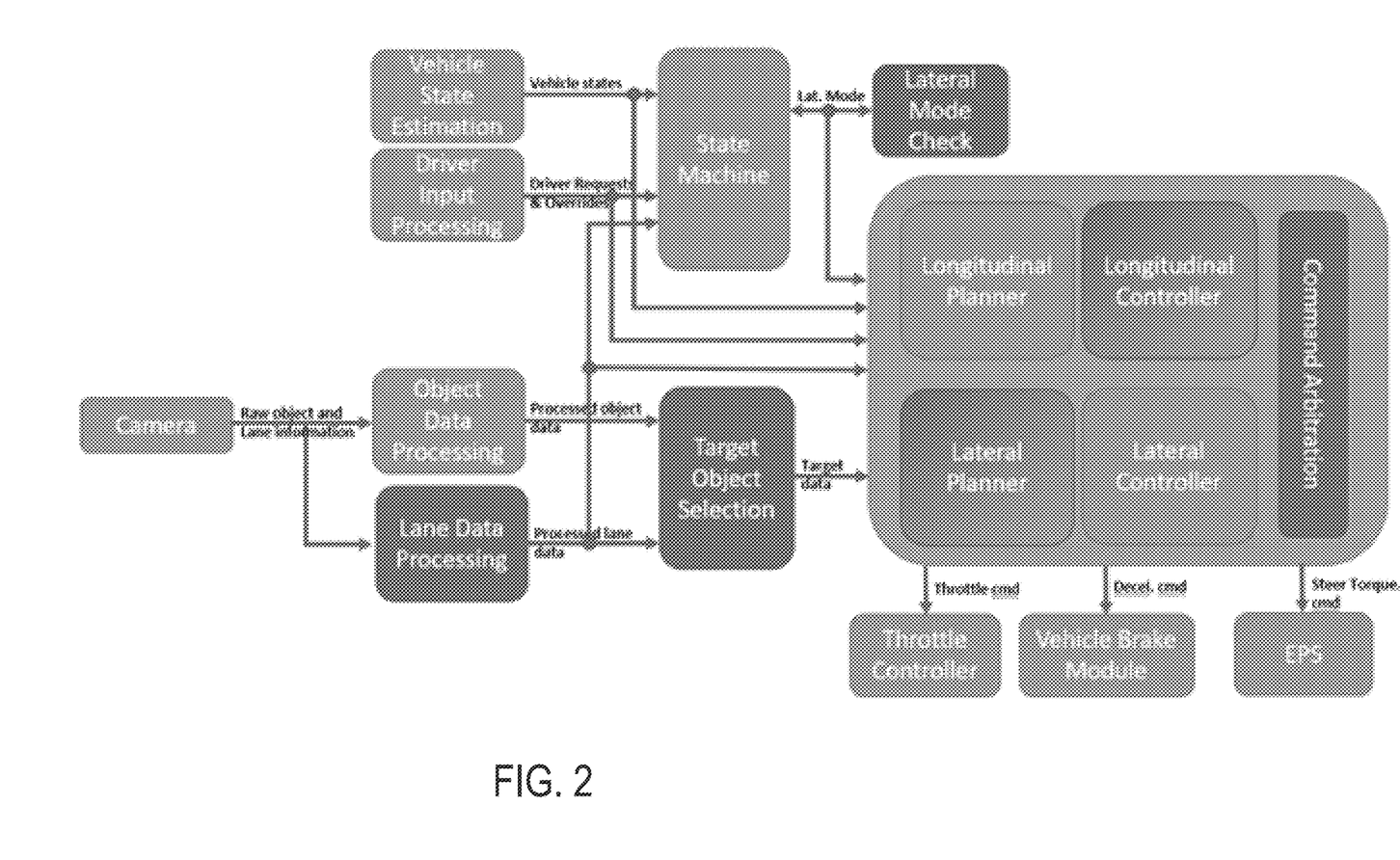
FIG. 2 is a block diagram showing elements of the traffic jam assist system.
Figure 3:
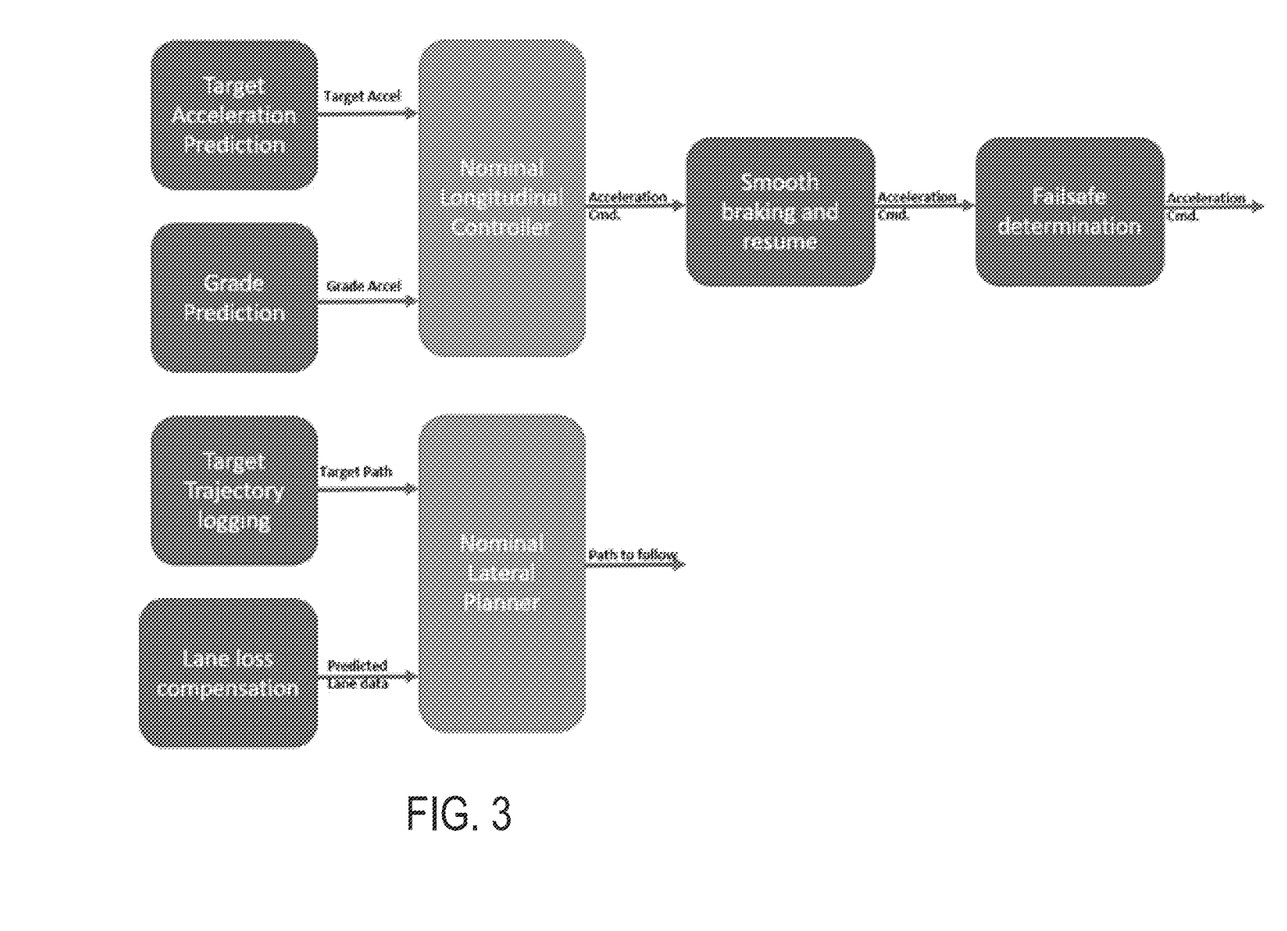
FIG. 3 is a block diagram showing the longitudinal control and the lateral planner of the traffic jam assist system of FIG. 2.

FIG. 2 shows the elements of a TJA system at a high level, while FIG. 3 provides additional detail for a nominal longitudinal controller and a nominal lateral planner, which include additional low-level components for the system.

As shown in FIG. 2, the camera (i.e., the forward viewing camera of FIG. 1) includes hardware and software for capturing and sending raw image data that includes object information regarding objects within the field of view of the camera. The object information may include information such as object positions (e.g., the position of other vehicles on the road in the field of view of the camera), relative velocities, heading, etc. The image data may include lane information (e.g., detected lane markers within the field of view of the camera). A lane data processor may receive the raw image data to process the lane information, such as to determine lane coefficients, quality, etc. The lane data processor modifies lane information such as lane coefficients to filter out sensor disturbances. The lane data processor selects and projects a lane marker with a lower absolute heading coefficient value in case of any significant deviation in properties between the left and right lane markers or lanes. The lane data processor may help ensure that the vehicle follows the traffic lane with minimal deviation among left and right lanes. For example, when the vehicle is driving along a highway and the right lane exits the highway while the left lane continues along the highway, the system will rely on the coefficient values to maintain following the left lane that follows the highway instead of the lane that exits the highway. An object data processing module receives the raw image data from the camera and is responsible for processing the raw object data captured by and provided by the camera. A target object selection module may receive processed lane data from the lane data processor and processed object data from the object data processor to enhance the inherent camera target selection logic for static objects to ensure sufficient stopping distance from the target during braking events.

A vehicle state estimator module estimates vehicle states. For example, various vehicle control modules/algorithms/ sensors may provide vehicle state information such as vehicle speed, yaw rate, etc. to the vehicle state estimator. A driver input processing module is responsible for processing driver inputs such as button presses as well as accelerator/ brake pedal actuation and steering wheel actuation. A state machine module is responsible for decision making to enable longitudinal/lateral controls based on environmental conditions as well as vehicle states and driver inputs. The state machine module receives inputs from the vehicle state estimator, the driver input processor, the lane data processor, and/or a lateral mode check module. The lateral mode check module enforces the lane availability on the lateral control portion of TJA with some rule relaxation logic (e.g., to incorporate traffic intersection scenarios). Typically, traffic jam assist features are only operable or only apply when lanes are identifiable (e.g., from lane markers). However, when, for example, a vehicle passes through an intersection, the system may temporarily lose the capability of identifying the lane. Instead of disabling the traffic jam assist function during these brief periods, the system may include relaxation logic by relaxing the condition for lane presence by extrapolating current lane information from the last available lane information and/or the latest sensor information/ vehicle states. That is, the system may extrapolate the lane when lane information is lost for a threshold period of time (e.g., while passing through an intersection) based on lane information obtained prior to the intersection.

A Longitudinal Planner module may be responsible for generating a continuous vehicle speed profile/target distance profile to achieve smooth vehicle acceleration profiles under all conditions. The longitudinal controller module (FIGS. 2 and 3) represents the control mechanism that is used to determine the required acceleration based on vehicle speed/ target distance and the vehicle states. The nominal lateral planner module (FIGS. 2 and 3) may be responsible for generating a desired trajectory for the vehicle to follow based on lane and object information within vehicle dynamic constraints. A lateral controller module may represent the control mechanism that determines the final steering torque based on the planned trajectory and vehicle response.

Optionally, a throttle controller is the vehicle propulsion system (hardware and software) that applies engine torque to enable the ADAS feature for longitudinal control of the vehicle. A vehicle brake module may be the braking system (hardware and software) that applies braking torque command to enable ADAS feature for longitudinal control. An electric power steering (EPS) system may be the steering system (hardware and software) that applies steering torque command to enable ADAS feature for lateral control. A command arbitration module constrains the longitudinal control motion based on the vehicle instantaneous lateral acceleration to enhance vehicle stability under unsafe conditions.

Referring now to FIG. 3, the Traffic Jam Assist ADAS system generates longitudinal and lateral commands based on camera signals (based on image processing of image data captured by the forward viewing camera). A target acceleration or velocity predictor predicts the acceleration of the target (i.e., a leading vehicle) to ensure enhanced stopping capability of the vehicle. The target acceleration predictor may predict the acceleration based on target attributes obtained from the image data such as target position, target velocity, etc.

A grade estimator or prediction module is responsible for determining the vehicle grade through advanced filtering techniques to update the longitudinal command accordingly.

This estimation may be based on the vehicle longitudinal acceleration and longitudinal velocity. A smooth brake and resume module ensures that the vehicle comes to stand-still with minimal jerk and starts smoothly from stand-still in the presence of a target (i.e., a leading vehicle). A fail-safe determination module determines if the system by itself cannot prevent an imminent collision (i.e., with a leading vehicle) and commands the maximum deceleration available for TJA in such instances. A target trajectory logging module keeps track of the target trajectory for enabling object following at low speeds. This algorithm has been developed to enhance system performance under loss of lane conditions in the presence of preceding targets (e.g., leading vehicles). A lane loss compensation module uses vehicle odometry to predict the extrapolated lane coefficients in cases of intermittent lane loss (traffic intersections, etc.).

Thus, implementations herein provide a traffic jam assist system that controls the vehicle to avoid collision with other vehicles and to provide smooth braking and acceleration as the equipped vehicle travels in a high traffic condition. The system includes one or more cameras that capture image data that is processed by the traffic jam assist system. Optionally, the camera(s) are included within a module (such as a front camera module (FCM)) that includes an image processor and ADAS feature software supporting the functionality describing above. That is, in some examples, a camera ECU locally processes the captured image data to perform traffic jam assist functions. In other examples, the camera module includes an image processor that processes the image data and a separate ECU or processor that executes the ADAS feature software. In yet other examples, the camera module includes an image processor that processes the image data and the ADAS feature software is executed by an ECU or processor of the vehicle that is remote from the camera module.

For autonomous vehicles suitable for deployment with the systems described herein, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472;

US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system with traffic jam assist, the vehicular control system comprising:

a camera disposed at a vehicle equipped with the vehicular control system and viewing at least forward of the vehicle, the camera capturing image data;

an electronic control unit (ECU) comprising electronic circuitry and associated software;

wherein the electronic circuitry of the ECU comprises an image processor for processing image data captured by the camera;

wherein the ECU, via processing by the image processor of image data captured by the camera, determines lane information of a traffic lane along a road being traveled by the equipped vehicle, wherein the lane information comprises lane boundaries;

wherein the ECU determines at least one virtual lane boundary with a lower absolute heading coefficient value relative to the determined lane boundaries;

wherein the ECU generates lateral commands for centering the vehicle within the traffic lane based at least in part on the determined at least one virtual lane boundary;

wherein the ECU, via processing by the image processor of image data captured by the camera, determines presence of a plurality of other vehicles on the road ahead of the equipped vehicle;

wherein the ECU, responsive to determining a target vehicle of the plurality of other vehicles ahead of the equipped vehicle and travelling in the same traffic lane as the equipped vehicle, and at least in part via processing by the image processor of image data captured by the camera, predicts a change in velocity of the target vehicle relative to the equipped vehicle arising from acceleration by the target vehicle or deceleration by the target vehicle, and wherein the ECU predicts the change in velocity of the target vehicle based at least in part on target attributes derived from the image data captured by the camera, and wherein the target attributes comprise a position of the target vehicle; and wherein the ECU, based on the determined at least one virtual lane boundary and based on the predicted change in velocity of the target vehicle, generates longitudinal and lateral commands for centering the vehicle within the traffic lane and maintaining a threshold distance between the equipped vehicle and the target vehicle.

2. The vehicular control system of claim 1, wherein the vehicular control system predicts the change in velocity of the target vehicle relative to the equipped vehicle to ensure enhanced stopping capability of the equipped vehicle relative to the target vehicle.

3. The vehicular control system of claim 1, wherein the vehicular control system comprises a fail-safe determination module that determines if the vehicular control system by itself cannot prevent an imminent collision and commands the maximum deceleration available when the vehicular control system cannot prevent the imminent collision.

4. The vehicular control system of claim 1, wherein, responsive to failing to determine the lane boundaries, the ECU estimates the lane boundaries based on previously determined lane information.

5. The vehicular control system of claim 4, wherein the estimated lane boundaries are further based on vehicle odometry of the equipped vehicle.

6. The vehicular control system of claim 4, wherein the ECU estimates the lane boundaries when the equipped vehicle passes through an intersection.

7. The vehicular control system of claim 1, wherein the ECU constrains longitudinal motion of the equipped vehicle based on an instantaneous lateral acceleration of the equipped vehicle.

8. The vehicular control system of claim 1, wherein the ECU, responsive to estimating a grade of the traffic lane, updates the generated longitudinal commands.

9. A vehicular control system with traffic jam assist, the vehicular control system comprising:
a camera disposed at a vehicle equipped with the vehicular control system and viewing at least forward of the vehicle, the camera capturing image data;
an electronic control unit (ECU) comprising electronic circuitry and associated software;
wherein the electronic circuitry of the ECU comprises an image processor for processing image data captured by the camera;
wherein the ECU, via processing by the image processor of image data captured by the camera, determines lane information of a traffic lane along a road being traveled by the equipped vehicle, wherein the lane information comprises lane boundaries;
wherein the ECU determines at least one lane virtual lane boundary with a lower absolute heading coefficient value relative to the determined lane boundaries;
wherein the ECU generates lateral commands for centering the vehicle within the traffic lane based at least in part on the determined at least one virtual lane boundary;
wherein the ECU, via processing by the image processor of image data captured by the camera, determines presence of a plurality of other vehicles on the road ahead of the equipped vehicle;
wherein the ECU, responsive to determining presence of a target vehicle of the plurality of other vehicles ahead of the equipped vehicle and travelling in the same traffic lane as the equipped vehicle, and at least in part via processing by the image processor of image data captured by the camera, predicts a change in velocity of the target vehicle relative to the equipped vehicle based on target attributes derived from image data captured by the camera, and wherein the target attributes comprise (i) acceleration by the target vehicle or deceleration by the target vehicle and (ii) position of the target vehicle;
wherein the ECU estimates a grade of the traffic lane; and
wherein the ECU, based on the determined at least one virtual lane boundary and based on the predicted change in velocity of the target vehicle and responsive to estimating the grade of the traffic lane, generates longitudinal and lateral commands for centering the vehicle within the traffic lane and maintaining a threshold distance between the equipped vehicle and the target vehicle.

10. The vehicular control system of claim 9, wherein, responsive to failing to determine the lane boundaries, the ECU estimates the lane boundaries based on previously determined lane information.

11. The vehicular control system of claim 10, wherein the estimated lane boundaries are further based on vehicle odometry of the equipped vehicle.

12. The vehicular control system of claim 11, wherein the ECU estimates the lane boundaries when the equipped vehicle passes through an intersection.

13. A vehicular control system with traffic jam assist, the vehicular control system comprising:
a camera disposed at a vehicle equipped with the vehicular control system and viewing at least forward of the vehicle, the camera capturing image data;
an electronic control unit (ECU) comprising electronic circuitry and associated software;
wherein the electronic circuitry of the ECU comprises an image processor for processing image data captured by the camera;
wherein the ECU, via processing by the image processor of image data captured by the camera, determines lane information of a traffic lane along a road being traveled by the equipped vehicle, wherein the lane information comprises lane boundaries;
wherein the ECU determines at least one virtual lane boundary with a lower absolute heading coefficient value relative to the determined lane boundaries;
wherein the ECU generates lateral commands for centering the vehicle within the traffic lane based at least in part on the determined at least one virtual lane boundary;
wherein the ECU, via processing by the image processor of image data captured by the camera, determines presence of a plurality of other vehicles on the road ahead of the equipped vehicle;
wherein the ECU, responsive to determining presence of a target vehicle of the plurality of other vehicles ahead of the equipped vehicle and travelling in the same traffic lane as the equipped vehicle, and at least in part via processing by the image processor of image data captured by the camera, predicts a change in velocity of the target vehicle relative to the equipped vehicle arising from acceleration by the target vehicle or deceleration by the target vehicle, and wherein the ECU predicts the change in velocity of the target vehicle based at least in part on target attributes derived from the image data captured by the camera, and wherein the target attributes comprise a position of the target vehicle;
wherein the ECU, based on the determined at least one virtual lane boundary and based on the predicted change in velocity of the target vehicle, generates longitudinal and lateral commands for centering the vehicle within the traffic lane and maintaining a threshold distance between the equipped vehicle and the target vehicle, and wherein the ECU constrains longitudinal motion of the equipped vehicle based on an instantaneous lateral acceleration of the equipped vehicle; and
wherein the vehicular control system comprises a fail-safe determination module that determines if the vehicular control system by itself cannot prevent an imminent collision and commands the maximum deceleration available when the vehicular control system cannot prevent the imminent collision.

14. The vehicular control system of claim 13, wherein the ECU, responsive to estimating a grade of the traffic lane, updates the generated longitudinal commands.

15. The vehicular control system of claim 13, wherein, responsive to failing to determine the lane boundaries, the ECU estimates the lane boundaries based on previously determined lane information.

\* \* \* \* \*